United States Patent [19]

Muraki

[11] Patent Number: 4,635,199

[45] Date of Patent: Jan. 6, 1987

[54] PIVOT-TYPE MACHINE TRANSLATING SYSTEM COMPRISING A PRAGMATIC TABLE FOR CHECKING SEMANTIC STRUCTURES, A PIVOT REPRESENTATION, AND A RESULT OF TRANSLATION

[75] Inventor: Kazunori Muraki, Tokyo, Japan

[73] Assignee: NEC Corporation, Tokyo, Japan

[21] Appl. No.: 605,159

[22] Filed: Apr. 30, 1984

[30] Foreign Application Priority Data

Apr. 28, 1983 [JP] Japan .................................. 58-74993
Apr. 28, 1983 [JP] Japan .................................. 58-74994

[51] Int. Cl.$^4$ ...................... G06F 15/38; G09B 19/06; G10L 5/02
[52] U.S. Cl. .................................... 364/419; 364/513; 364/200; 364/900; 434/157; 381/51
[58] Field of Search ............... 364/419, 200, 900, 513; 434/156, 157, 159; 381/51, 52

[56] References Cited

U.S. PATENT DOCUMENTS

| | | | |
|---|---|---|---|
| 4,158,236 | 6/1979 | Levy | 364/419 X |
| 4,412,305 | 10/1903 | Yoshida | 364/419 X |
| 4,438,505 | 3/1984 | Yanagiuchi | 364/419 X |
| 4,443,856 | 4/1984 | Hashimoto et al. | 381/51 X |
| 4,455,615 | 6/1984 | Tanimoto et al. | 381/51 X |
| 4,460,973 | 7/1984 | Tanimoto, II | 364/419 X |
| 4,464,731 | 8/1984 | Nishimura | 364/419 X |
| 4,475,171 | 10/1984 | Kanou | 364/419 X |
| 4,509,137 | 4/1985 | Yoshida, II | 364/419 X |
| 4,541,069 | 9/1985 | Kanou et al. | 364/419 X |

OTHER PUBLICATIONS

Amamiya et al., "Japanese Ouestion—Answering System in the topic of Figure Manipulations", *Review of the Electrical Communications Laboratories*, vol. 26, Nos. 7–8, (Jul.–Aug. 1978) pp. 1045–1054.
Wilks, "An Artificial Intelligence Approach to Machine Translation", Chapter 3 of Computer Models of Though and Language, edited by Roger C. Schank, W. H. Freeman & Co. San Francisco, (1973).

*Primary Examiner*—Jerry Smith
*Assistant Examiner*—Jon D. Grossman
*Attorney, Agent, or Firm*—Schwartz, Jeffery, Schwaab, Mack, Blumenthal & Evans

[57] ABSTRACT

In a machine translating system wherein word units of a source language are translated to word units of a target language through pivot words of a pivot language, a pragmatic table keeps the pivot words as dominant and dependant pairs together with a relation symbol specifying a semantic relationship between the pivot words of each pair in the pivot language and with surface data representative of the relationship in surface structures of the source and target languages. On analyzing an input word unit string into a source semantic structure, the pragmatic table is referenced to link the pivot words into pairs by relation symbols incompliance with the dominant and dependant pairs and the source surface data therefor. The semantic structure is therefore allowed by the pragmatic table. On mapping the semantic structure to a pivot representation and the representation to a target semantic structure in consideration of wording of the target language, the pragmatic table is similarly referred to. The representation and the target semantic structure are thereby checked against the dominant and dependant pairs and the relation symbols therefor. On generating an output word unit string from the target semantic structure, the pragmatic table is likewise referenced to check whether or not the output string is allowed by the dominant and dependant pairs and the target surface data therefor.

3 Claims, 17 Drawing Figures

| [0.X]>[1.ATT]>[2.ELEMENT]<br>>[3.VAL]>[4.Y]# | [0.X]>[1.ELM]>[4.Y]# |
|---|---|
| [0.DO]>[1.OBJ]>[2.PROCESS]# | [0.PROCESS]# |
| | |

FIG. 10(A)
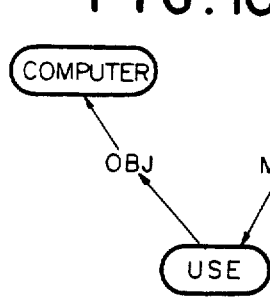
FIG. 10(B)
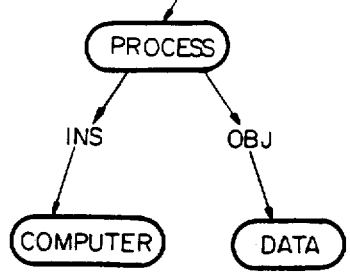
FIG. 11
| | 48 |
|---|---|
| [0.X]>[1.MET]>[2.USE]<br>>[3.OBJ]>[4.Y] # | [0.X]>[5.INS]>[4.Y] # |
| [0.X]>[1.MET]>[2.USE]<br>>[3.OBJ]>[4.Y] # | [0.X]<[5.OBJ]<[6.PROVIDE],<br>[6.PROVIDE]>[7.INS]>[3.OBJ]<br>>[4.Y] # |
| | |
FIG. 12
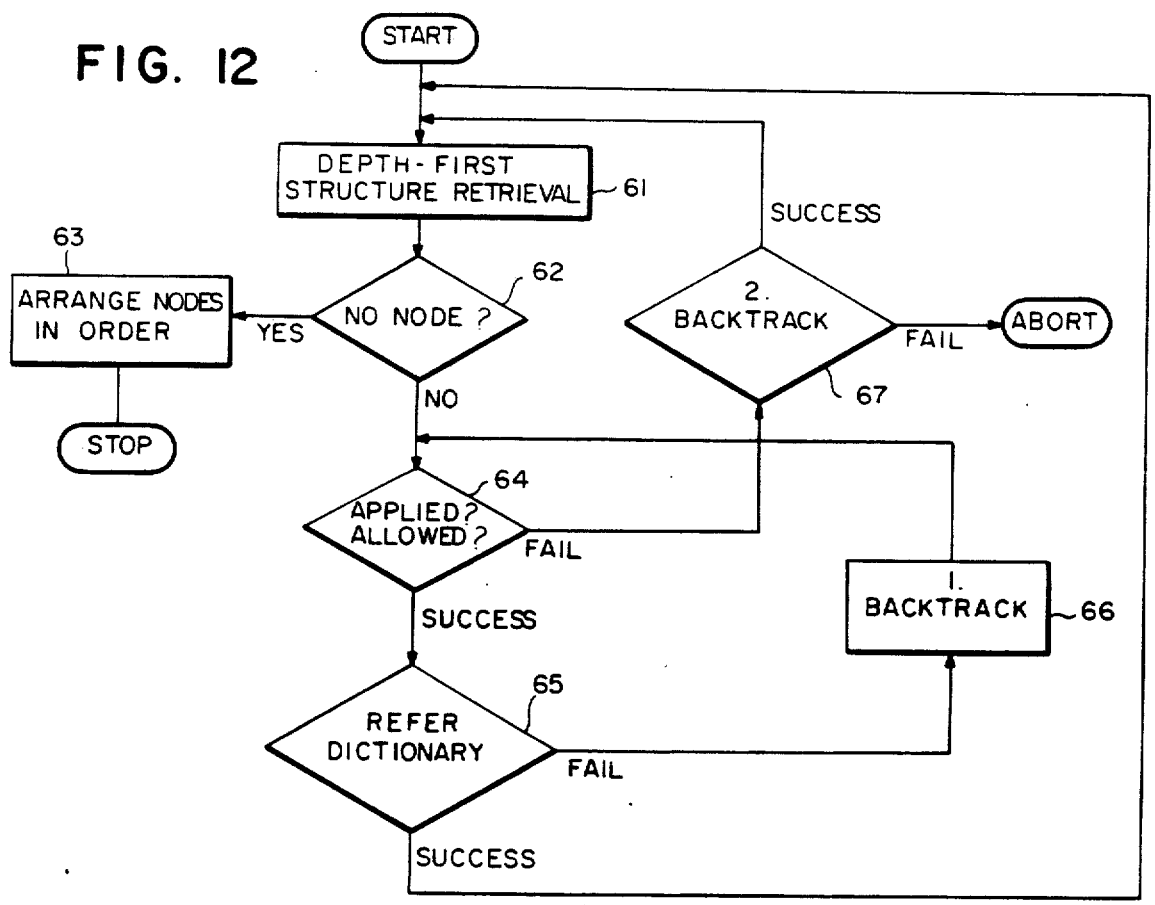

FIG. 13

| $C_1$ | $C_2$ | ... | $C_j$ | ... | $D_1$ | $D_2$ | ... | $D_k$ | ... | R | $E_1$ | ... | $E_q$ | ... | $J_1$ | ... | $J_p$ |
|---|---|---|---|---|---|---|---|---|---|---|---|---|---|---|---|---|---|
| ACT | | | | | SYSTEM | | | | | INS | E WITH | | | | J. de | | |
| FAIL | | | | | ERROR | | | | | REA | E BECAUSE | | | | J. ni yori | | |
| PROCESS | | | | | USE | OBJ SYSTEM | | | | MET | E. BY | | | | J. te | | |
| DO | | | | | PROCESS | | | | | OBJ | | | | | J. wo | | |
| PROVIDE | | | | | PROCESS | | | | | OBJ | E. ⌀ | | | | | | |

| | SUPERORDINATE | | WHOLE | | ENTIRETY | |
|---|---|---|---|---|---|---|
| $A_1$ | $A_{111}$ $A_{112}$ | --- | $A_{121}$ $A_{122}$ | --- | $A_{131}$ $A_{132}$ | --- |
| $A_2$ | $A_{211}$ $A_{212}$ | --- | $A_{221}$ $A_{222}$ | --- | $A_{231}$ $A_{232}$ | --- |
| $A_3$ | $A_{311}$ $A_{312}$ | --- | $A_{321}$ $A_{322}$ | --- | $A_{331}$ $A_{332}$ | --- |

76

PIVOT-TYPE MACHINE TRANSLATING SYSTEM COMPRISING A PRAGMATIC TABLE FOR CHECKING SEMANTIC STRUCTURES, A PIVOT REPRESENTATION, AND A RESULT OF TRANSLATION

BACKGROUND OF THE INVENTION

This invention relates to a machine translating system of the so-called pivot type.

A machine translating system comprises a source language dictionary for keeping word units of a source language and semantic symbols representative of the respective source language word units. A target language dictionary is for keeping semantic symbols which are common to those kept in the source language dictionary. The target language dictionary is for furthermore keeping word units of a target language for the semantic symbols kept therein, respectively. Each semantic symbol is used as an intermediary between word units of a plurality of languages and will herein be called a pivot word.

Such machine translating systems are generally divisible into three types, namely, transfer, pivot, and hybrid types. The pivot type is proposed by Yorick Wilks and described by him in detail in Chapter Three of a book "Computer Models of Thought and Language" edited by Roger C. Schank and pulbished 1973 by W. H. Freeman and Company, San Francisco, Calif.

With a machine translating system of the pivot type, a first string or sequence of source language word units is subjected to syntaxic analysis and mapped to a source semantic structure representative of the first string by those selected pivot words which are located in the source language dictionary in compliance with the respective first string word units and are representative of a certain number of target language word units. The semantic structure is standardized into a pivot representation by using the pivot words of the semantic structure. The pivot representation is mapped to a target semantic structure by using the pivot words of the pivot representation. The target language dictionary is referenced by the pivot words of the target semantic structure to provide the above-mentioned certain number of target language word units as selected word units. The target semantic structure and the selected word units are used to generate a second string by the selected word units as a result of translation of the first string.

With a conventional machine translating system of the pivot type, the syntaxic analysis often leaves ambiguity in the source semantic structure. In a worst case, the source semantic structure is meaningless. Moreover, it is not seldom that the second string is crumsy as a sentence or a phrase of the target language as will later be exemplified with reference to one of fifteen figures of the accompanying drawing.

SUMMARY OF THE INVENTION

It is therefore an object of the present invention to provide a machine translating system of the so-called pivot type, which is capable of checking a source semantic structure, a pivot representation, a target semantic structure, and a result of translation.

It is another object of this invention to provide a machine translating system of the type described, which is capable of providing the result of translation in compliance with wording or diction of a target language.

It is a further object of this invention to provide a machine translating system of the type described, for which it is possible to change the target language from one to another with least labor and least cost.

According to this invention, there is provided a machine translating system comprising: a dictionary of a first language for storing word units of the first language and pivot words representative of the word units; a dictionary of a second language for storing word units of the second language and pivot words representative of the second language word units, common pivot words stored in the first language dictionary; a pragmatic table for keeping pairs of the pivot words and those pragmatic data for each pivot word pair which define a semantic relationship between the pivot words of the pivot word pair in at least three languages which comprise a pivot language and the first and second languages; the pivot language serving as a pivot on carrying out translations between those of the at least three languages which do not include the pivot language; analyzing means for analyzing a first string of word units of one of the first and the second languages, which is selected as a source language with the other of the first and second languages used as a target language, by referring to the dictionary of the source language and to the pragmatic table to provide selected pivot words in compliance with the first string word units and to provide a source semantic structure by the selected pivot words and by semantic relationships which are allowed by the pragmatic data in the source language and have features of the source language; standardizing means for standardizing the semantic structure by referring to the pragmatic table to provide a pivot representation by using the pivot words of the semantic structure and by semantic relationships which are allowed by the pragmatic data in the pivot language and are free from the features of the source language; wording means for wording the pivot representation by referring to the pragmatic table to provide a target semantic structure by using the pivot words of the pivot representation and by semantic relationships which are allowed by the pragmatic data in the pivot language and comply with wording of the target language; and translating means for translating the target semantic structure by referring to the dictionary of the target language and to the pragmatic table to provide a second string of selected work units which are selected from the word units of the target language to represent the pivot words of the target semantic structure where the second string is allowed by the pragmatic data in the target language.

BRIEF DESCRIPTION OF THE DRAWING

FIGS. 10 (A) and (B) show another pivot representation and a target semantic structure, respectively;

FIG. 11 exemplifies a few rules of wording;

FIG. 12 is a flow chart for use in describing operation of a wording unit;

FIG. 13 shows entries of a pragmatic table knowledge base of a pragmatic table for use in the machine translating system mentioned in conjunction with FIG. 2;

FIG. 14 shows entries of a thesaurus knowledge base of the pragmatic table mentioned in connection with FIG. 13.

DESCRIPTION OF THE PREFERRED EMBODIMENTS

Figure 1:
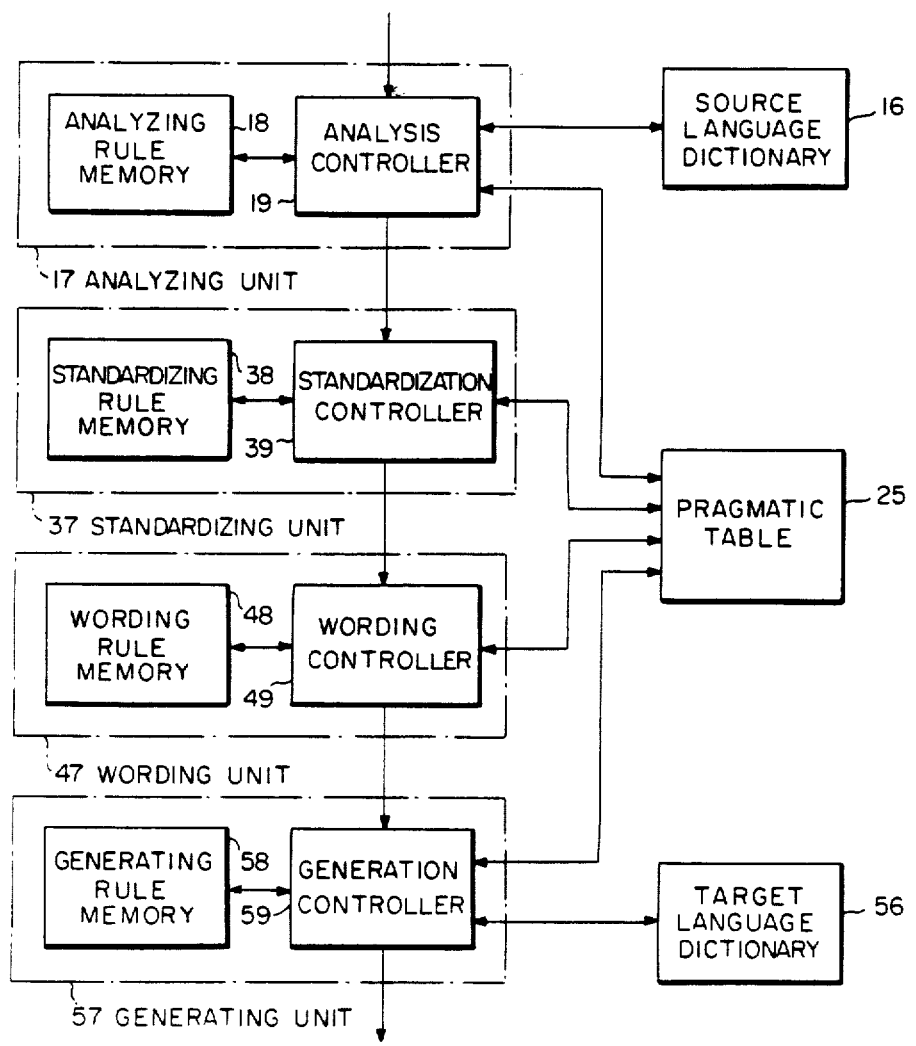
FIG. 1 is a block diagram of a machine translating system according to an embodiment of the instant invention.

Referring to FIG. 1, a machine translating system according to an embodiment of the present invention is for carrying out machine translation between at least two natural and/or artificial languages. The artificial languages may be machine languages. Merely for brevity of the description, it will be assumed that the translation is carried out between a first and a second language with one thereof selected as a source language and with the other used as a target language. More specifically, let the source language be Japanese and the target language, English. The machine translating system comprises a source language dictionary 16 as is the case with a conventional machine translating system.

Figure 2:
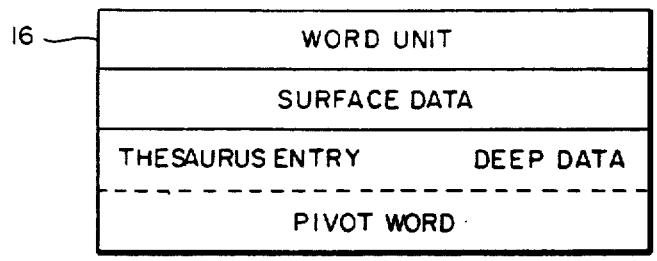
FIG. 2 shows an entry in a dictionary of a source language for use in a machine translating system according to a more preferred embodiment of this invention.

Turning of FIG. 2, each entry of the source language dictionary 16 comprises a word unit of the source language and a pivot word, as herein called, representative of the word unit under consideration. The pivot word serves as a semantic datum of the entry. The source language dictionary 16 is for keeping a sufficient number of source language word units and pivot words for the respective word units. When a word unit represents a plurality of distinct meanings, a like number of pivot words are kept as seperate entries for the word unit in question. On the other hand, a common pivot word is kept for a plurality of perfectly synonymous word units under individual entries. It is possible, however, to understand without loss of generality that the pivot words are in one-to-one correspondence to the word units. Each pivot word may therefore be a binary word of, for example, sixteen bits. In order merely to facilitate an understanding of the description, the pivot words will be represented throughout the following description by English words. Each pivot word will be enclosed in the description with a pair of brackets rather than encircled as in the drawing.

Figure 3:
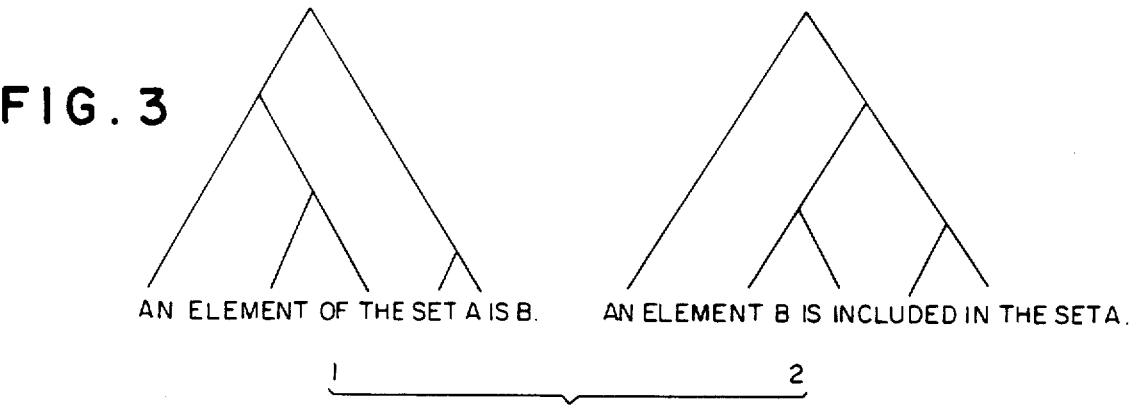
FIG. 3 exemplifies two three diagrams representative of two input sentences, respectively.

Turning further to FIG. 3, first and second syntaxic structures 1 and 2 represent first and second input sentences as tree diagrams. The input sentences are written in English rather than in Japanese merely for an easy understanding of the description.

It is to be pointed out here that the same fact or proposition is expressed by the sentences 1 and 2 and may be expressed also by some other sentences which are not shown for brevity of the description. In the sentences 1 and 2, a combination of lexicographic word "set" and a symbol "A" is regarded as a single word unit. The translation may be from a phrase in the source language to a corresponding phrase in the target language. What should be translated, is herein called a first string of word units. FIG. 3 therefore shows the structures 1 and 2 together with two first strings. Incidentally, what is obtained as a result of translation of the first string, is herein named a second string of word units. It is to be noted that each string can be understood as a time sequence of word units.

Figure 4:
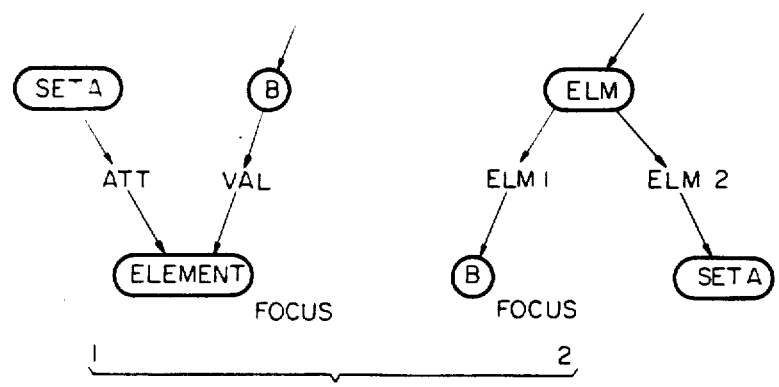
FIG. 4 shows two source semantic structures representative of the respective sentences exemplified in FIG. 3.

Referring back to FIG. 1 and afresh to FIG. 4, an analyzing unit 17 is for analyzing a first string of source language word units by referring to the source language dictionary 16 to provide a source semantic structure. First and second source semantic structures 1 and 2 are obtained for the respective first strings exemplified in FIG. 3. In each semantic structure, the pivot words, such as [element] and [set A], are located or found in the source language dictionary 16 as selected pivot words in compliance with the respective first string word units and are linked or combined by relation symbols into directional branches of a directional tree diagram in the manner which will presently be described more in detail. It may be mentioned here for the time being that each relation symbol represents a semantic relationship between a pair of pivot words, that the pivot words and the relation symbols serve as nodes in the directional tree diagram, and that each directional branch is depicted in general by an arrow starting from a starting pivot word of a pivot word pair and ending at a relation symbol for the pivot word pair and by another arrow which starts from the relation symbol and ends at a terminal pivot word of the pivot word pair.

Each relation symbol will be denoted by an abbreviated English word for a better understanding of the description are written in the description with addition thereto of the quotation marks. In the semantic structure 1, "att" and "val" represent an attribute and a value. In the semantic structure 2, "elm 1" and "elm 2" show first and second elements.

In order to conveniently provide each semantic structure, the analyzing unit 17 comprises an analyzing rule memory 18 for keeping rules of syntaxic or grammatical analysis. With reference to the source language dictionary 16 and the analyzing rule memory 18, an analysis controller 19 analyzes each first string into a source semantic structure as will shortly be described more in detail. As will become clear as the description proceeds, the analysis controller 19 is a memory for keeping instructions of the analysis.

The machine translating system comprises a pragmatic table 25 for keeping pairs of pivot words and those pragmatic data for each pivot word pair which define a semantic relationship between the pivot words of the pivot word pair under consideration in a pivot language and in the source and the target languages. The pivot language is so called because the "language" is independent of the source and the target languages and serves as a pivot therebetween. The pragmatic table 25 will be described later in detail together with the pragmatic data.

It may be mentioned here that a pragmatic datum is given in each of the source and the target languages by a surface datum representative of a surface relationship between the pivot words of the pair, that a pragmatic datum is given in the pivot language by a relation symbol which corresponds to the surface data of the source and the target languages, and that the analyzing unit 17 refers to the pragmatic table 25 by the analysis controller 19 to check whether or not the analysis gives a result which is allowed by the pragmatic data in the source language. In other words, each source semantic structure is given by the selected pivot words and by semantic relationships which are allowed by the pragmatic data in the source language. As will later become clear, the semantic relationships have features of the source language.

Referring again to FIG. 2, each entry of the source language dictionary 16 further comprises surface data and additional semantic data. The surface data represent roles of the word unit of the entry in a surface structure in the source language and include that one of the parts of speech, to which the word unit belongs, and surface case information. In addition to the pivot word, the semantic data comprise a thesaurus entry, which will later be described, and deep data representative of roles of the word unit in a deep structure. When the word unit is a full or class word, the deep data include deep case information.

Figure 5:
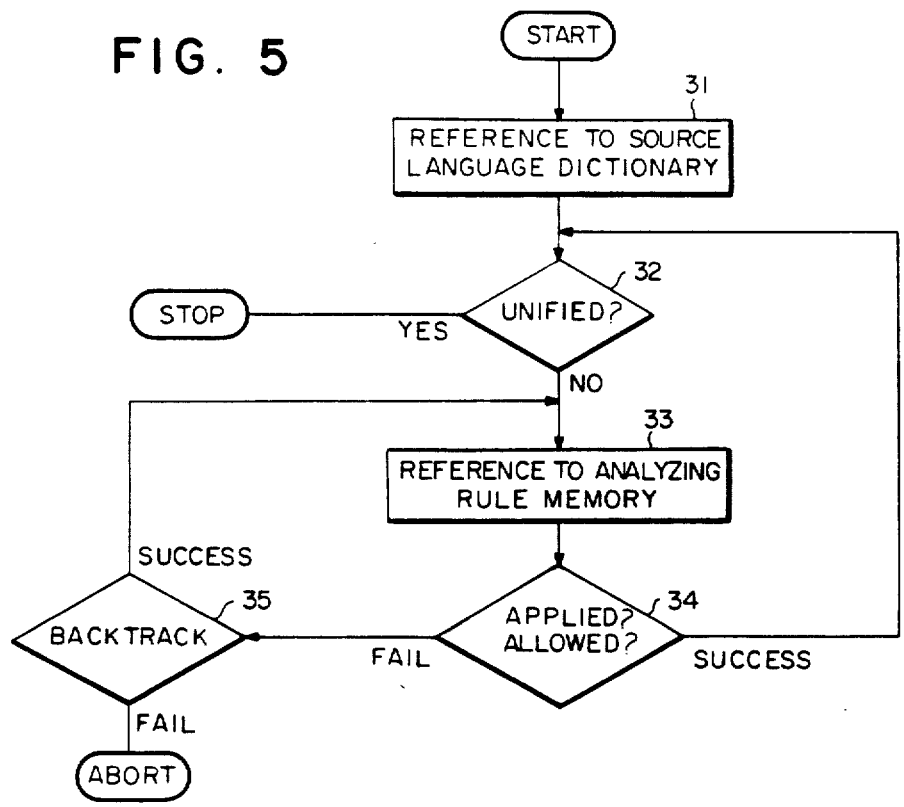
FIG. 5 is a flow chart for use in describing operation of an analyzing unit.

Referring to FIG. 5, the analysis controller 19 refers to the source language dictionary 16 at a first step 31 by each word unit of the first string to provide selected pivot words for the respective first string word units. The selected pivot word, the thesaurus entry, and the surface and the deep data are combined with each word unit to provide a pivot word combination. The successively obtained pivot word combinations may result in a unified structure by the surface and the deep data of the respective combinations in the manner known in the art of language analysis. If unification is found at a second step 32 for the combinations obtained for the whole first string, the analysis comes to an end.

Figure 6:
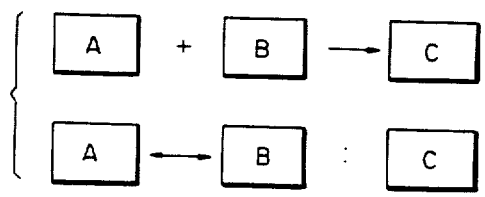
FIG. 6 shows a pair of rules of analysis for a string of word units of the source language and of generation of another string of word units of a target language.

Turning to FIG. 6, it is desirable for application of the machine translating system to a variety of languages that the rules of analysis be interlingual, namely, independent of languages. In the example being illustrated, each rule of a pair comprises a lefthand and a righthand side connected together either by an arrow symbol or by a two-dot symbol. Each of symbols A through C depicted in each rule in a rectangle, will be enclosed by a pair of brackets in the following description.

On the lefthand side, each of first and second body parts [A] and [B] (the same notation for the pivot word [B] being used) represents either a pivot word combination or a partial structure into which two or more pivot word combinations are unified. More particularly, each partial structure may be a unification or concatenation of pivot word combination and/or previously obtained partial structures. The analyzing rule memory 18 (FIG. 1) keeps a few hundred of such rules.

The rules of analysis are used also as rules of generation of a second string of target language word units. The rules seen from a standpoint of the generative grammer will later be described.

From a viewpoint of the analysis, the rule including the arrow symbol represents that the first and the second body parts [A] and [B] are unified into a head [C]. The rule with the two-dot symbol represents that the unification is allowed only when the word unit included in the first body part [A] sppears earlier than the word unit of the second body part [B] in the time sequence of the first string being processed. When unified, the body parts [A] and [B] give the head [C] as what is herein called an analyzed pair of pivot words which are linked by an analyzed datum.

Turning back to FIG. 5, the analysis controller 19 refers to the analyzing rule memory 18 at a third step 33 by first and second body parts if unification is not found at the second step 32 for at least a part of the first string. Merely for brevity of the description, let the body parts be given by first and second pivot word combinations.

A pair of rules of analysis is selected at the third step 33 and applied at a fourth step 34 to the first and the second pivot word combinations. The rule pair may show that it is possible to provide a head by the word units of the respective combinations and the surface and/or the deep data for the respective combinations. When the rule pair is thus applicable, the pivot words of the respective combinations give an analyzed pair of pivot words. The surface datum gives an analyzed datum which links the word units represented by the analyzed pair in the first string.

The pragmatic table 25 is referenced also at the fourth step 34 by the analyzed pair and the analyzed datum as will be described later in the following. When the pivot words of the analyzed pair are kept in the pragmatic table 25 as one of the pivot word pairs and furthermore when the analyzed datum is kept as the surface datum for the above-mentioned one pivot word pair, the analysis controller 19 makes the pragmatic table 25 produce that relation symbol as an analyzed symbol which corresponds to the analyzed datum. A directional branch of the source semantic structure is given by the analysed pair and the analyzed symbol. In this manner, the unification will eventually be found at the second step 32.

If application of a pair of rules of analysis to the first and the second pivot combinations fails at the fourth step 34, the analysis controller 19 refers again to the analyzing rule memory 18 at a first or backtrack step 35 for a different pair of rules and applies the different pair to the first and the second pivot word combinations. Even if the rule pair is applicable to the pivot word combinations, a different rule pair is searched at the backtrack step 35 if no directional branch is allowed by the pragmatic data in the source language at the fourth step 34. When the first string is successfully mapped to the source semantic structure, the analysis comes to an end.

If application of a particular rule pair to the first and the second pivot word combinations fails at the fourth step 34, the particular rule pair may be applied to a different pair of pivot word combinations at the backtrach step 35. If it happens that no source semantic structure is obtained at all, the machine translation aborts.

Figure 7:
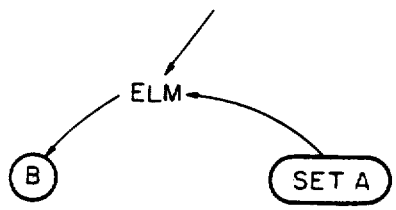
FIG. 7 shows a pivot representation into which the source semantic structures of FIG. 4 are unified.

Referring back to FIG. 1 and anew to FIG. 7, a standardizing unit 37 is for standardizing each source semantic structure with reference to the pragmatic table 25 to provide a pivot representation. The semantic structures 1 and 2 exemplified in FIG. 4, are mapped to a single pivot representation illustrated in FIG. 7. The pivot representation has a directional network structure and no loop. In the illustrated example, the pivot representation comprises the pivot words [B] and [set A] of the semantic structures 1 and 2 as nodes and a relation symbol "elm" as another node. In other words, the pivot representation is given by using the pivot words of each source semantic structure 1 or 2 and semantic relationships which are allowed by the pragmatic data in the pivot language and are free from the features of the source language.

Figures 8, 9:
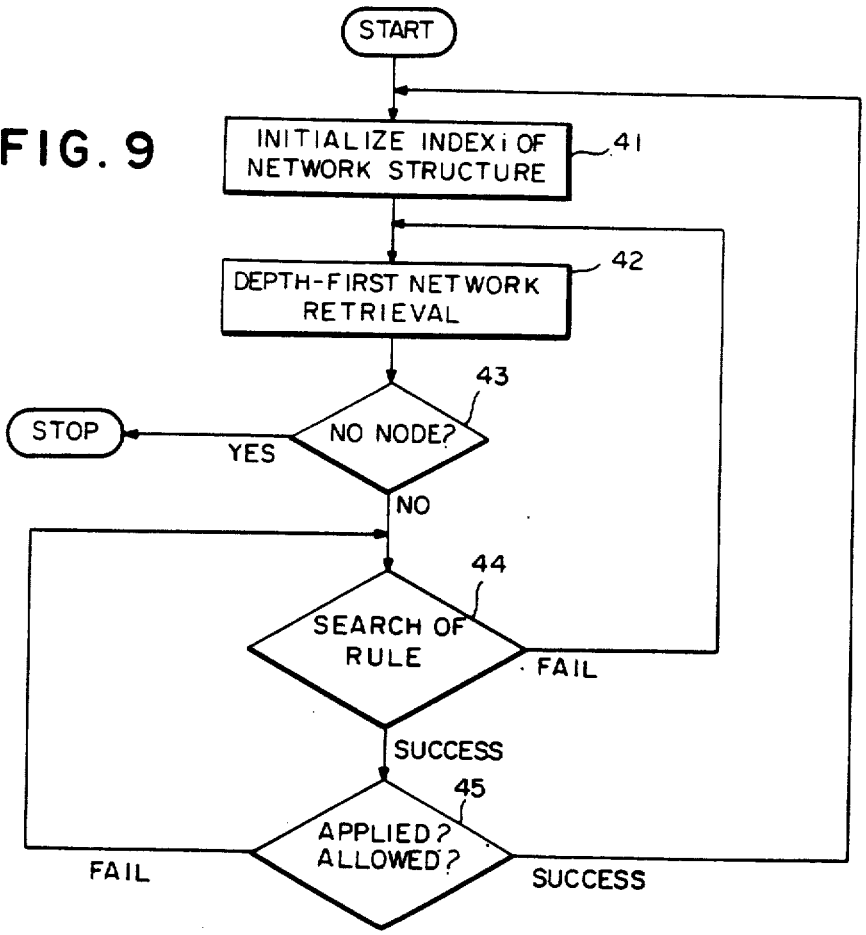
FIG. 8 exemplifies a few rules of standardization.
FIG. 9 is a flow chart for use in describing operation of a standardizing unit.

Referring to FIG. 8 in addition to FIG. 1, the standardizing unit 37 comprises a standardizing rule memory 38 for keeping rules of standardization and a standardization controller 39 for referring to the standardizing rule memory 38 and the pragmatic table 25 so as to map each source semantic structure to a pivot representation. Each rule of standardization has a lefthand and a righthand side representative of a partial set of at least one directional branch of a source semantic structure and a partial set of at least one directional path of a corresponding pivot representation, respectively. In the partial sets, the nodes of the pivot words and the relation symbols are depicted in bracket pairs with provisional node numbers 0, 1, and so forth given to the nodes along the arrows which link the nodes into the respective partial sets. Notations X and Y represent matching variables. In the manner known in the art of language analysis, a number mark represents an end. A comma (FIG. 11) is interposed between two consecutive partial sets. When a first node dominates a second node as a dominant, the first and the second nodes are coupled by a symbol representative of "greater than." When the first node is dominated by the second node as a dependant, the nodes are concatenated by a symbol indicative of "less than."

A rule of standardization is depicted along the top line of FIG. 8, according to which the source semantic structure 1 exemplified in FIG. 4 is mapped to the pivot representation of FIG. 7. It is to be noted that the provisional node numbers 2 and 3 are present on the lefthand side and not on the righthand side. Such nodes [2. element] and [3. val] are deleted in the pivot representation.

Another rule is shown along the next line. The lefthand side represents a partial source semantic structure for a first string of Japanese word units which would read "[to] do (or carry out) processing" if the Japanese word units are literally translated into English. Nodes [1. obj] and [2. process] are absent on the righthand side. The partial semantic structure is therefore mapped to a partial pivot representation which represents "[to] process" alone by a single nose [0. process]. In the latter example, use of "do (or carry out)" is a feature of the Japanese structure according to a certain grammar although the Japanese expression corresponding to the English word "do" is a verb ending according to the traditional orthography in the Roman script of Japanese as used in a small book "An Outline of the Grammar of Colloquial Japanese" edited by Nippon-no-Rômazi-Sya, a foundation in Japan, and published 1916 by that foundation. At any rate, the pivot representation is rendered in this manner free from the features of the source language.

Referring to FIG. 9, the standardization controller 39 initializes an index i at a first step 41. This is in order to set the index i at the top node of a source semantic structure. Depth-first network retrieval is carried out at a second step 42, starting at the top node. At first, the semantic structure under processing includes a plurality of nodes which should successively be retrieved for the standardization in the manner described in the following. When no node is found at a third step 43 to be left for retrieval, the standardization comes to an end.

If at least one node is left as a node for retrieval, the standardization controller 39 refers to the standardizing rule memory 38 at a fourth step 44 in search of a rule which should be used in standardizing a partial set of at least one directional branch which starts at the node to be retrieved. When successfully found, the rule is tried at a fifth step 45 to the partial set in question. If no rule is found at the fourth step 44, the depth-first network retrieval is again carried out with the index i renewed.

More particularly, the node to be retrieved is compared at the fifth step 45 with the matching variable which has the provisional node number 0 in the lefthand side of the rule. Subsequently in the fifth step 45, the nodes following in the partial set the node to be retrieved, are compared with the nodes given the other node numbers in the lefthand side in consideration of the symbols for "greater than" and/or "less than." If the comparison shows that the rule is applicable to the partial set, the righthand side gives a partial set of at least one directional path of the pivot representation.

It is to be noted here that the pragmatic table 25 is referenced at the fifth step 45 by the pivot word pair or pairs of the above-mentioned at least one directional path and the relation symbol or symbols used therein. Only when the nodes of the at least one directional path are present as an entry in the pragmatic table 25, the partial set of the at least one directional path is used in the pivot representation.

When the rule is successfully applied at the fifth step 45 with the directional path allowed by the pragmatic data in the pivot language, the operation returns to the first step 41 to renew the index i. Either if the comparison fails at the fifth step 45 or if the comparison is successful and nevertheless the reference to the pragmatic table 25 indicates that the partial path is not allowed by the pragmatic data in the pivot language, another rule of standardization is searched at the fourth step 44 for the node being dealt with.

Referring now to FIGS. 10 (A) and (B), attention will be directed to a different example, A pivot representation is illustrated in FIG. 10 (A), which shows that [computer] is an object ("obj") of [use] and that [use] is linked to [process] to represent a method ("met"). If the pivot representation were directly mapped to a target semantic structure (not shown), a second string would read "Using computer, data are processed." It would be more desirable that the fact be expressed by a string which reads "Computer processes data." The pivot representation is therefore worded according to this invention into a target semantic structure depicted in FIG. 10 (B) in consideration of wording or diction of the target language, wherein [computer] is linked to [process] as an instrument ("ins") or as a noun of the instrumental case. The second string will read "Data are processed with computer."

Turning back to FIG. 1, a wording unit 47 is for wording a pivot representation with reference to the pragmatic table 25 to provide a target semantic structure of the type illustrated with reference to FIG. 10 (B). In the target semantic structure, the pivot words [computer], [process], and [data] and the relation symbols "ins" and "obj" are used as nodes. As will later become clear, the pivot words are linked to one another by semantic relationships which are allowed by the pragmatic data in the pivot language and comply with wording of the target language.

The wording unit 47 comprises a wording rule memory 48 for keeping rules of wording and a wording controller 49 for wording each pivot representation into a target semantic structure with reference to the wording rule memory 48 and the pragmatic table 25.

Turning to FIG. 11, the rules of wording are similar in format to the rules of standardization. A rule is shown along the top line, according to which the pivot representation of FIG. 10 (A) is mapped to the target semantic structure shown in FIG. 10 (B). The nodes depicted on the lefthand side with the provisional node numbers 1 through 3 are deleted in a partial set of directional branches given by the righthand side for the target semantic structure. Instead, the nodes given on the righthand side with a new provisional node number 5 is generated afresh in the partial set of directional branches. Incidentally, the next line of FIG. 11 shows a rule for mapping the partial set of directional paths illustrated on the lefthand side of the top line, to a different partial set of directional branches.

Operation of the wording controller 49 (FIG. 1) is similar to that of the standardization controller 39 and will not be described in detail. The wording rule memory 48 is referred to at the fourth step 44 (FIG. 9) in place of the standardizing rule memory 38. The pragmatic table 25 is referenced at the fifth step 45 again for the pragmatic data in the pivot language. The wording or diction is given by the wording rules rather than by the pragmatic data.

Referring to FIGS. 1 and 2 once again, a target language dictionary 56 has entries which correspond to those in the source language dictionary 16. More particularly, the pivot words are those kept in the source language dictionary 16. The word units are, however, those of the target language. It naturally follows that the correspondence of the word units to the pivot words may be different in some respects between the source and the target language dictionaries 16 and 56. Furthermore, the surface and the deep data are those of the target language.

In FIG. 1, a translating or generating unit 57 is for referring to the target language dictionary 56 and the pragmatic table 25 in translating a target semantic structure into a second string of those selected word units of the target language which are located in the target language dictionary 56 in compliance with the pivot words of the target semantic structure being processed. In the second string, the selected word units should be arranged or concatenated in conformity with the target semantic structure and as allowed by the pragmatic data in the target language.

The translating unit 57 comprises a generating rule memory 58 for keeping rules of generation of the second strings and a generation controller 59 for referring to the target language dictionary 56, the generating rule memory 58, and the pragmatic table 25 to carry out generation of each second string.

The rules of generation are not different from the rules of analysis as has already been mentioned in conjunction with FIG. 6. When viewed from the standpoint of the generative grammar, and head [C] is decomposed into first and second body parts [A] and [B] according to a rule including the arrow symbol in a pair of rules. According to another rule depicted in the pair with the two-dot symbol, the decomposition is allowed only when the first body part [A] occurs earlier than the second body part [B] in the time sequence of a second string. The relationship between the body parts [A] and [B] is given by the surface and the deep data for the respective pivot words and by the grammatical data in the target language as will shortly become clear.

Turning to FIG. 12, the generation controller 59 carries out generation of a second string by applying depth-first structure retrieval to the top node of the target semantic structure as indicated at a first step 61. If no node is found at a second step 62 to be left for retrieval in the whole target semantic structure being dealt with, the already treated nodes are arranged in order at a third step 63 into a second string. Generation of the second string comes to an end.

If a node is found at the second step 62 as a node to be retrieved, the generation controller 59 refers to the generating rule memory 58 at a fourth step 64 to apply a pair of rules of generation to the node under consideration. When the head [C] of the rule pair includes the node in question, the head [C] is decomposed into first and second body parts [A] and [B]. The body parts [A] and [B] include the pivot words as a specific pair of pivot words linked by the surface and the deep data of the target language. The specific pair is used in referring to the pragmatic table 25. When the specific pair is kept in the pragmatic table 25, the surface datum of the target language is produced in correspondence to the relation symbol of the target semantic structure.

When the generating rule pair is successfully applied to the node to be retrieved and furthermore when the specific pivot word pair is successfully allowed by the pragmatic data in the target language, the target language dictionary 56 is referenced at a fifth step 65 by the pivot words given by the body parts [A] and [B]. The target language dictionary 56 is consulted at first by the pivot word in one of the body parts [A] and [B] that dominates the other. Subsequently, the dictionary 56 is consulted by the pivot word included in the other body part.

If reference to the target language dictionary 56 fails at the fifth step 65, the generation controller 59 searches another pair of rules of generation at a first backtrack step 66 for the node being processed. Either if application of the rule pair fails or if reference to the pragmatic table 25 is unsuccessful, the generation controller 59 again carries out the depth-first structure retrieval at a second backtrack step 67 for the immediately previously treated node.

Referring now to FIG. 13, the pragmatic table 25 preferably comprises a pragmatic table knowledge base 71 for keeping the pivot words having a dominating and dominated semantic relationship as a dominant and a dependant of each dominant and dependant pair. Such dominants and dependants will singly or collectively be designated by C1 and D1 and are, for example, [act] and [system] used in a phrase (expressed in English) "[to] act with a system" and [fail] and [error] used in another phrase "[to] fail because of error(s)." When there is at least one pivot word which is preliminarily dominated by the dominant C1 or the dependant D1 of a dominant and dependant pair, such pivot words are kept at C2 to Cj and D2 to Dk. For example, [system] is kept at D2 together with a relation symbol "obj" as a preliminary dependant of a preliminary dominant [use] which is a dependant of a dominant [process]. The entries are for use in a phrase "[to] process by using a system." The dominant and the dependant C1 and D1 of each pair will be called head pivot words depending on the circumstances. The pivot words kept in C1 through Cj and in D1 through Dk will collectively be denoted by Cm and Dn.

A relation symbol R is kept for each pair of the head pivot words C1 and D1. The relation symbol R more particularly specifies the dominating and dominated relationship. For example, a relation symbol "ins" is kept for the pivot word pair [act] and [system] to indicate that [system] is governed by [act] as a word of the instrumental case. The relation symbol R's are independent of the source and the target languages and are therefore in the pivot language. Incidentally, the relation symbol "rea" represents reason.

Surface attributes which link the head pivot words of each pair in the source and the target languages, are kept as surface data J1 to Jp and E1 to Eq where J and E represent Japanese and English. In order to facilitate the understanding, the surface data are given first in English and then in Japanese. The surface data of the languages used as the source and the target languages will be called source and target surface data. For a dominant and dependant pair, the relation symbol R and the source and the target surface data, such as J1 to Jp and E1 to Eq, are in one-to-one correspondence.

It is to be noted that the Japanese word units are selected with little regards to the orthography. By way of example, a compound postposition "ni yori" is regarded as a single word unit. A verb ending "te" is selected as a separate word unit contrary to the grammar used, for example, in "Pocket Handbook of Colloquial Japanese" published 1920 by the above-named foundation in Japan and in Roy Andrew Miller, "Bernard Bloch on Japanese" published 1969 at Yale University Press.

Turning to FIG. 14, the pragmatic table 25 more preferably comprises a thesaurus knowledge base 76 in addition to the pragmatic table knowledge base 71. A thesaurus entry A is given in the source language dictionary 16 (FIGS. 1 and 2) for each word unit and is a partial set of the pivot words which include the pivot word given for the word unit in question. In other words, the pivot word serves as a hyponym or subordinate with a hyperonym or superordinate given by the thesaurus entry A for the pivot word under consideration. As a consequence, a thesaurus entry A is generally common to a plurality of pivot words although the pivot words may be different between the source and the target language dictionaries 16 and 56. The number of thesaurus entries A's used in the source and the target language dictionaries 16 and 56 may be about one tenth of the number of pivot words. Such thesaurus entries A's are kept in the thesaurus knowledge base 76 in a matrix form with suffixes attached to the notation A as will be described immediately in the following.

In FIG. 14, the thesaurus entries A's are kept along a zeroth column as thesaurus headwords A1, A2, and so forth. For each headword Ar, at least one thesaurus entry Ar11, Ar12, . . . or {Ar1} is kept along a first column. Each of the first-column thesaurus entries {Ar1} gives a superordinate or hyperonym with a subordinate or hyponym given by the headword Ar in question. Each of second-column thesaurus entries Ar21, Ar22, . . . or {Ar2} gives a whole with a part given by the headword Ar. Each of third-column thesaurus entries Ar31, Ar32, . . . or {Ar3} gives an entirety with a component or element given by the headword Ar. The semantic relationships of superordinate to subordinate, part to whole, and component to entirety will be designated by relation symbols "sup" (superordinate), "pof" (part of), and "com" (component).

As the case may be, each of the superordinate, whole, and entirely will be called a genus with the subordinate, part, and component named species. The partial sets {Ar1}, {Ar2}, and {Ar3} will be referred to as generic entries. The semantic relationship between the genus to the species will be called a genus to species relationship and represented by an additional relation symbol named a genus symbol.

Figure 15:
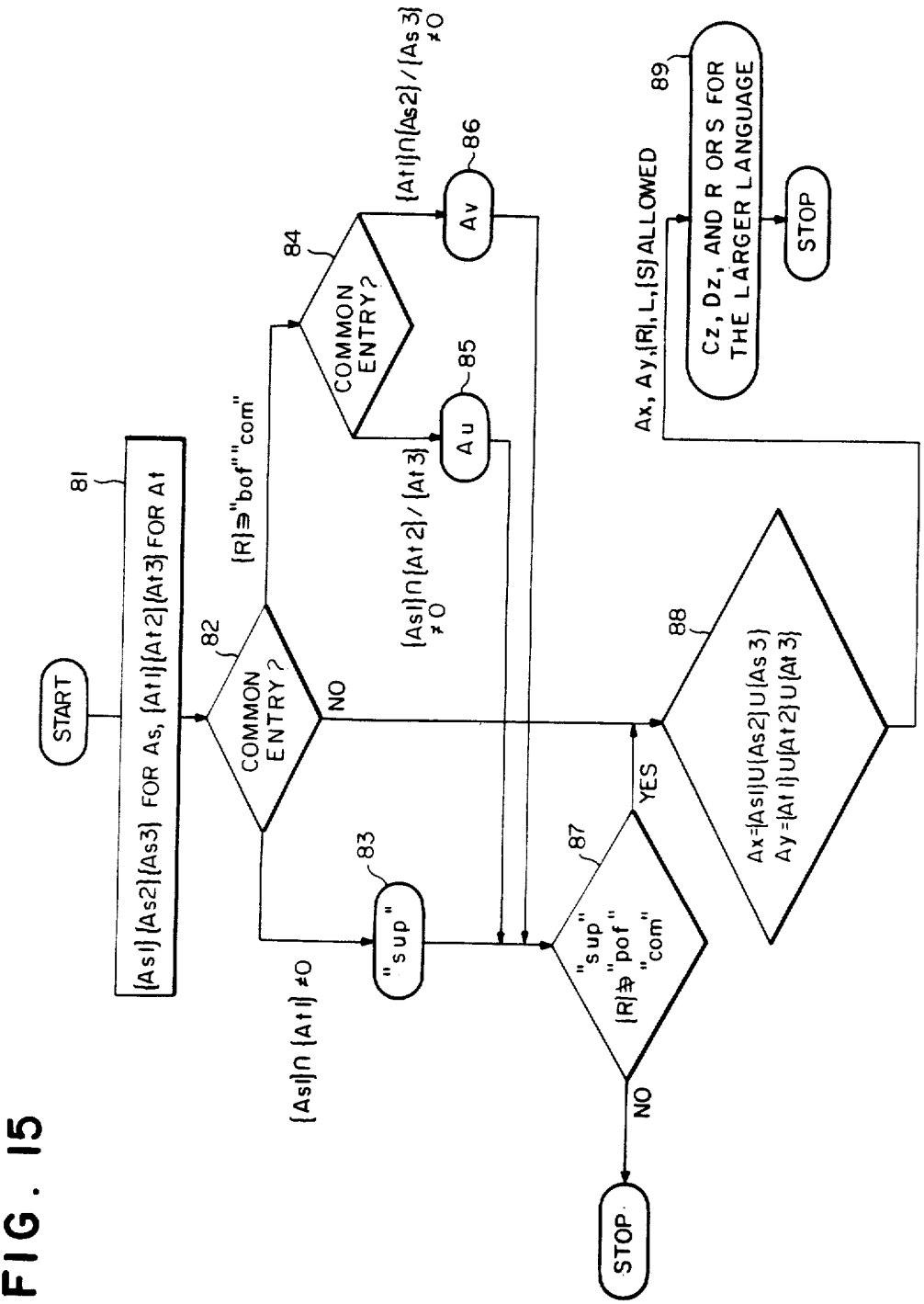
FIG. 15 is a flow chart for use in describing operation of the pragmatic table mentioned in conjunction with FIGS. 13 and 14.

Finally referring to FIG. 15, each of the analysis, standardization, wording, and generation controllers 19, 39, 49, and 59 refers to the pragmatic table 25 by accessing the thesaurus knowledge base 76 at first at a first step 81. The thesaurus entries included in the first and the second pivot word combinations [A] and [B] of each pair, are used by each of the analysis and the generation controllers 19 and 59 in finding a pair of those thesaurus headwords among the headwords Ar's which will be named a first and a second headword and designated by As and At. A pair of thesaurus entries combined with the respective pivot words in each righthand side of FIGS. 8 or 11, is used by the standardization and the wording controllers 39 and 49 as the first and the second headwords As and At. Moreover, the relation symbols, designated by {R} in FIG. 15, for the first and the second headwords As and At are used by the standardization, wording, and generation controllers 39, 49 and 59. In any event, the thesaurus knowledge base 76 produces a pair of superordinates {As1} and {At1}, a pair of wholes {As2} and {At2}, and/or a pair of entireties {As3} and {At3}.

When at least one thesaurus entry is found by the controller 19, 39, 49, or 59 at a second step 82 common in the superordinate pair, the controller produces the relation symbol "sup" at a third step 83. When a thesaurus entry is found at a fourth step 84 common in a pair of the superordinate for the first headword As and either the whole or the entirety for the second headword At, the common entry is produced as a first common entry Au at a fifth step 85. When a thesaurus entry is found at the fourth step 84 common in a pair of the superordinate for the second headword At and either of the whole and the entirety for the first hardword As, the common entry is produced at a sixth step 86 as a second common entry Av.

The relation symbol "pof" or "com" is produced concurrently with the common entry Au or Av. If produced, one of the relation symbols "sup," "pof," and "com" is used to represent a semantic relationship in each of the source semantic structure, pivot representation, and target semantic structure.

Either if no common thesaurus entry is found at the second step 82 or if a relation symbol is found at a seventh step 87 indicative of a semantic relationship which is other than the superordinate to subordinate ("sup"), the whole to part ("pof"), and the entirety to component ("com") relationships, the controller 19, 39, 49, or 59 refers to the pragmatic table knowledge base 71 at an eighth step 88. Otherwise, the first and the second headwords As and At are allowed by the pragmatic table 25 together with the semantic relationships {R} therebetween. Reference to the pragmatic table 25 comes to an end.

On referring to the pragmatic table knowledge base 71 at the eighth step 88, the analysis controller 19 furthermore specifies Japanese as the language, which is designated by L in FIG. 15, and the surface data, denoted by {S}, for the word units included in the first and the second headwords As and At. The generation controller 59 specifies English as the language L. Each first generic entry for the first headword As will be designated by Ax with each second generic entry for the second headword At denoted by Ay. One of the first and the second generic entries Ax and Ay is used in search of the dominants {Cm} with the other Ax or Ay used in searching the dependants {Dn}. Moreover, the other Ax or Ay is used in search of the dominants {Cm} with the above-mentioned one Ay or Ax used in searching the dependants {Dn}.

When the analysis controller 19 finds that an input given by the first and the second generic entries Ax and Ay and the surface datum S of the source language matches with a combination of the dominant CM, the dependant Dn, and the source surface datum S (J1 to Jp), the relation symbol R corresponding to the source surface datum S of the input is produced at a ninth step 89 together with the dominant and the dependant of the combination, which are denoted by Cz and Dz. The dominant Cz, dependant Dz, and the relation symbol R is used in the source semantic structure.

When the standardization and the wording controllers 39 and 49 similarly find a combination, the dominant Cz and the dependant Dz are produced at the ninth step 89 for use in the pivot representation and the target semantic structure, respectively, together with a relation symbol R (the same reference symbol being used) which may or may not be identical with the relation symbol R of the input.

When the generation controller 59 likewise finds a combination of the dominant Cm, the dependant Dn, and the relation symbol R, the dominant Cz and the dependant Dz are produced at the ninth step 89 together with the surface datum S which corresponds for the target language to the relation symbol R of the input. The dominant Cz and the dependant Dz are used in consulting the target language dictionary 56.

When the pragmatic table 25 does not comprise the thesaurus knowledge base 76 but only the pragmatic table knowledge base 71, the pragmatic table knowledge base 71 is directly accessed rather than indirectly through the thesaurus knowledge base 76. The access is carried out by the pivot word pair included either in the first and the second body parts [A] and [B] or in the lefthand side of the rule exemplified in FIG. 8 or 11 as described hereinabove. If there is no combination that matches with the input during the direct or the indirect access, the controller 19, 39, 49, or 59 produces a zero (not shown) to show that the input is not allowed by the pragmatic table 25.

Turning back to FIG. 2, it should be noted in connection with the above that the source and the target language dictionaries 16 and 56 are symmetric. It is therefore readily possible to use one and the other of the dictionaries 16 and 56 as a source and a target language dictionary. The only difference is such that the source language dictionary 16 or 56 is accessed by the analyzing unit 17 in compliance with the word units of the language used as the source language and that the target language dictionary 56 or 16 is consulted by the generating unit 57 in response to the pivot words of a target semantic structure to which each first string is mapped.

Similarly, the rules of analysis are readily used as the rules of generation. The rules of standardization are used likewise as the rules of wording.

While this invention has thus far been described with reference to the accompanying drawing, it will now readily be possible for one skilled in the art to carry this invention into effect in various other manners. Above all, the first and the second languages may be different aspects of a single language. In this instance, the machine translating system serves as a system for producing a fair copy from a draft. Each pivot word combination need not include the word unit of the source language provided that the source language dictionary 16 or 56 has entries for all word units used in the texts to be dealt with. On the other hand, each partial set of the thesaurus entries A's may include the relation symbols {R}.

What should additionally be pointed out is that it is readily possible with a machine translating system according to this invention to change the source and/or the target languages from one to another. The rules of analysis and of generation are readily arranged for a new language. The rules of standardization and of wording have a format independent of the languages as illustrated with reference to FIG. 6. It is readily feasible to arrange the rules to the new language. It is likewise feasible to arrange the pragmatic table knowledge base 71 to the new language. Alternatively, the pragmatic table knowledge base 71 may keep the surface data of three or more languages.

What is claimed is:

1. A machine translating system comprising:
    a dictionary of a first language for storing word units of said first language and pivot words representative of said word units;
    a dictionary of a second language for keeping word units of said second language and pivot words representative of said second language word units, common pivot words stored in said first language dictionary;
    a pragmatic table for storing pairs of pivot words and those pragmatic data for each pivot word pair which define a semantic relationship between the pivot words of the pivot word pair in at least three languages which comprise a pivot language and said first and said second languages, said pivot language serving as a pivot on carrying out translation between those of said at least three languages which do not include said pivot language;
    analyzing means for analyzing a first string of word units of one of said first and said second languages, which is selected as a source language with the other of said first and said second languages used as a target language, by referring to the dictionary of said source language and to said pragmatic table to provide selected pivot words in compliance with the first string word units and to produce a source semantic structure by said selected pivot words and by said selected pivot words and by semantic relationships which are allowed by the pragmatic data in said source language and have features of said source language;
    standardizing means for standardizing said semantic structure by referring to said pragmatic table to provide a pivot representation by using the pivot words of said semantic structure and by semantic relationships which are allowed by the pragmatic data in said pivot language and are free from the features of said source language;
    wording means for wording said pivot representation by referring to said pragmatic table to provide a target semantic structure by using the pivot words of said pivot representation and by semantic relationships which are allowed by the pragmatic data in said pivot language and comply with wording of said target language; and
    translating means for translating said target semantic structure by referring to the dictionary of said target language and to said pragmatic table to provide a second string of selected word units which are selected from the word units of said target language to represent the pivot words of said target semantic structure, said second string being allowed by the pragmatic data in said target language.

2. A machine translating system as claimed in claim 1, wherein:

said pragmatic table comprises a pragmatic table knowledge base for storing dominant and dependant pairs as the respective pivot word pairs, source surface data linking those of the word units of said source language which are represented by the respective dominant and dependant pairs, target surface data linking the target language word units represented by the respective dominant and dependant pairs, and relation symbols each of which corresponds to the source and the target surface data for one of said dominant and dependant pairs to specify a dominating and dominated relationship for said one of the dominant and dependant pairs, the pragmatic data in said pivot language comprising said relation symbols, the pragmatic data in said source and said target languages comprising said source and said target surface data;

said analyzing means being for providing said source semantic structure by using those of said dominant and dependant pairs and said relation symbols as analyzed pairs and analyzed symbols which are located in said pragmatic table knowledge base in compliance with pairs of said selected pivot words and in correspondence to those of said source surface data which link the first string word units, the pivot words and the semantic relationships of said source semantic structure being given by the pivot words of said analyzed pairs and by said analyzed symbols;

said standardizing means being for providing said pivot representation by using those of said dominant and dependant pairs and said relation symbols as particular pairs and particular symbols which are located in said pragmatic table knowledge base in response to said analyzed pairs and said analyzed symbols, the pivot words and the semantic relationships of said pivot representation being given by the pivot words of said particular pairs and by said particular symbols;

said wording means being for providing said target semantic structure by using those of said dominant and dependant pairs and said relation symbols as specific pairs and specific symbols which are located in said pragmatic table knowledge base in response to said particular pairs and said particular symbols, the pivot words and the semantic relationships of said target semantic structure being given by the pivot words of said specific pairs and by said specific symbols;

said translating means being for providing said second string by using those of the target language word units and the target surface data as said selected word units and as selected data which are located in said target language dictionary in compliance with said specific pairs and in said pragmatic table knowledge base in correspondence to said specific symbols, said selected data linking said selected word units.

3. A machine translating system as claimed in claim 2, the pivot words stored in said source and said target language dictionaries being divisible into partial sets, each partial set representing a hyperonym with hyponyms represented by the pivot words of the partial set, wherein:

said pragmatic table further comprises a thesaurus knowledge base for storing said partial sets as headwords, respectively, and different partial sets as generic entries for each headword, respectively, each of said generic entries having a genus to species relationship to the headword to provide a genus symbol as an addition to said relation symbols, the pivot word pairs of said pragmatic table comprising pairs of said headwords, the pragmatic data in said pivot language including said genus symbol;

said analyzing means being for providing said source semantic structure by referring to said thesaurus knowledge base prior to said pragmatic table knowledge base to select said genus symbol if a first pair of pivot words representative of two of the first string word units is included in one of the headword pairs, two of the pivot words and one of the semantic relationships of said source semantic structure being given by the pivot words of each first pair and by each selected genus symbol;

said standardizing means being for providing said pivot representation by referring to said thesaurus knowledge base prior to said pragmatic table knowledge base to choose said genus symbol if a second pair of pivot words of said source semantic structure is included in one of the headword pairs, two of the pivot words and one of the semantic relationships of said pivot representation being given by the pivot words of each second pair and by each chosen genus symbol;

said wording means being for providing said target semantic structure by referring to said thesaurus knowledge base prior to said pragmatic table knowledge base to elect said genus symbol if a third pair of pivot words of said pivot representaion is included in one of the headword pairs, two of the pivot words and one of the semantic relationships of said target semantic structure being given by the pivot words of each third pair and by each elected genus symbol;

said translating means being for providing said second string by referring to said thesaurus knowledge base prior to said pragmatic table knowledge base to pick up said genus symbol if a fourth pair of pivot words of said target semantic structure is included in one of the headword pairs, said translating means further referring to said target language dictionary by the pivot words of each fourth pair to provide two of the second string word units.

* * * * *